Figure 1:
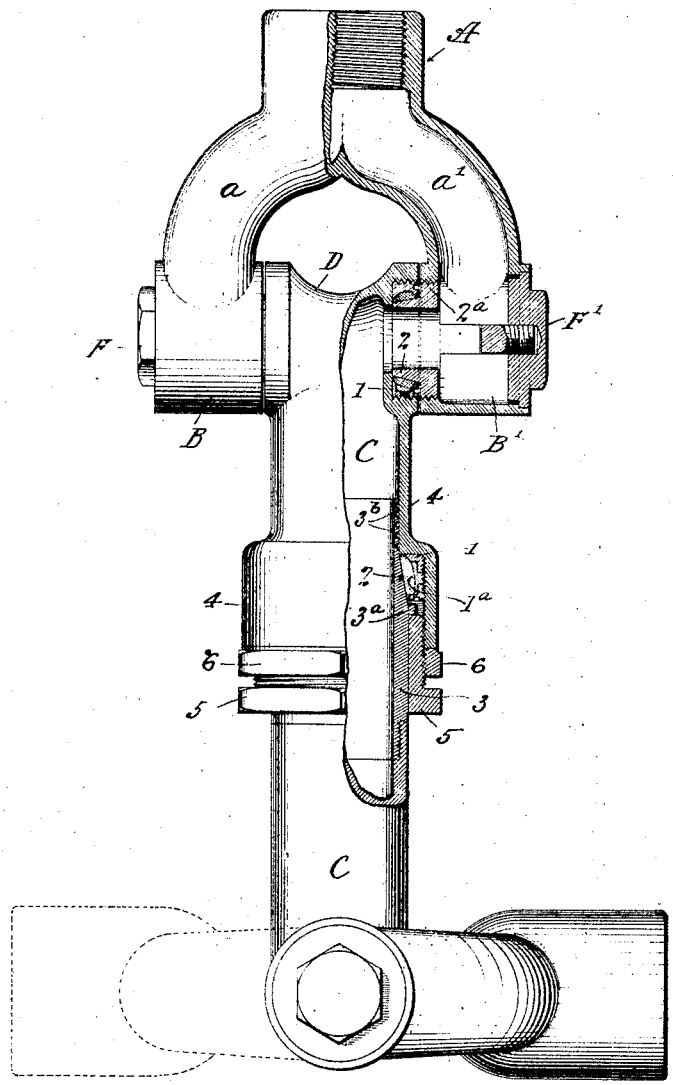

C. FORTH.
PIPE JOINT.
APPLICATION FILED OCT. 9, 1909.

1,003,042.

Patented Sept. 12, 1911.
2 SHEETS—SHEET 1.

WITNESSES
INVENTOR
Charles Forth
By Rogers & Kennedy
Attys.

C. FORTH.
PIPE JOINT.
APPLICATION FILED OCT. 9, 1909.
1,003,042.
Patented Sept. 12, 1911.
2 SHEETS—SHEET 2.
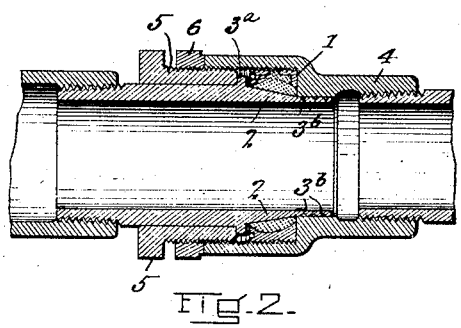
Fig. 2.
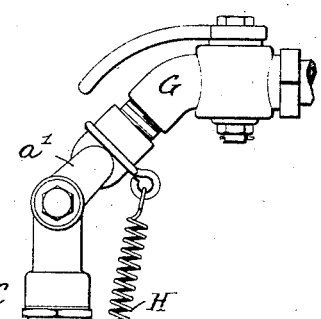
Fig. 3.
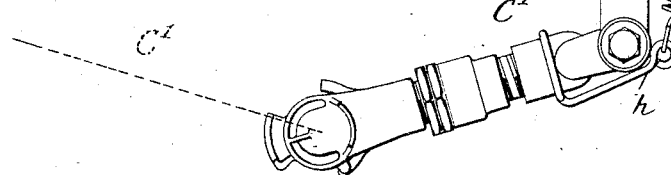
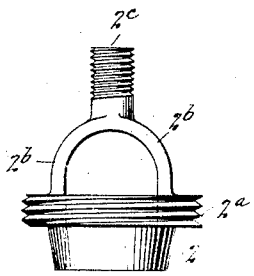
Fig. 4.
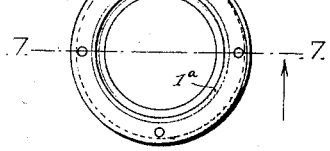
Fig. 6.
Fig. 7.
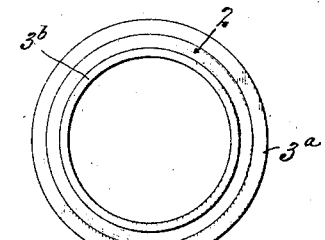
Fig. 9.
Fig. 5.
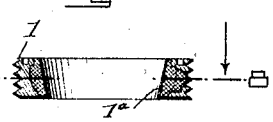
Fig. 8.
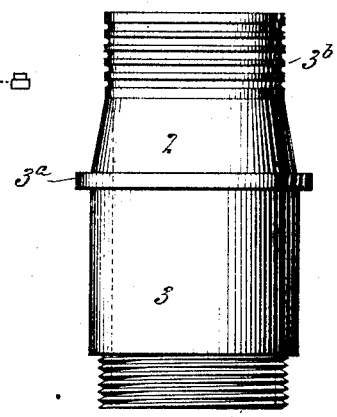
Fig. 10.
WITNESSES
Frank Ober
L. E. Morrison
INVENTOR
Charles Forth
By Rogers & Kennedy
Attys.

UNITED STATES PATENT OFFICE.

CHARLES FORTH, OF BOSTON, MASSACHUSETTS.

PIPE-JOINT.

1,003,042.　　　　　　Specification of Letters Patent.　　Patented Sept. 12, 1911.

Application filed October 9, 1909. Serial No. 521,790.

*To all whom it may concern:*

Be it known that I, CHARLES FORTH, a citizen of the United States, residing at Boston, in the county of Suffolk and State of Massachusetts, have invented certain new and useful Improvements in Pipe-Joints, of which the following is a specification, reference being had therein to the accompanying drawing.

This invention relates to pipe joints designed to enable the connected parts to move freely one relatively to the other, while at the same time preventing the escape of the fluid passing through them.

The invention has special reference to pipe installations on railway trains, where the connected parts are subjected to frequent relative movements, and where the fluid, such as steam or air passing through the pipes, is under considerable pressure.

The invention consists of an improved joint in which one of the parts is provided with a removable packing ring to receive a projection on the other part, means being provided for holding said parts in close frictional contact, thereby effectually sealing the joint against leakage, but permitting their free relative movements.

The invention consists also in improved means for so sustaining the parts of the joint, where they extend between coupled cars of a train, that the joint will be relieved of the weight of the connected sections.

In the accompanying drawings:—Figure 1 is a plan view, partly in section, of a flexible pipe connection, comprising both a swinging connection and swiveling joint. Fig. 2 is a longitudinal section through the swiveling joint. Fig. 3 is a side elevation of the flexible connection of Fig. 1, showing the same as applied to the pipe terminal of a railway car. Fig. 4 is a side elevation of the tapered projection carried by one of the members to be connected the said projection being in its preferred form. Fig. 5 is a plan view of the same. Fig. 6 is a plan view of the removable packing ring, in which the tapered projection is adapted to seat. Fig. 7 is a cross-section through the same on the line 7—7 of Fig. 6. Fig. 8 is a cross-section on the line 8—8 of Fig. 7. Fig. 9 is an end view of the tapered projection in modified form. Fig. 10 is a side elevation of the same.

Referring more particularly to Figs. 1, 3, 4, 5, 6, 7 and 8, my improved joint comprises as its essential features a packing ring 1 seated removably in one of the parts to be connected, and a tapered projection 2 carried by the other part and adapted to seat frictionally within the packing ring, suitable means being provided (as will be more fully described later on) to maintain the projection and ring in close fluid-tight contact. In Fig. 1 I have shown these parts applied to joints of two forms, one where the connected members have a pivotal or swinging motion relative to each other; and the other where the connected members extend in line and have a swiveling motion about a common longitudinal axis. In both cases, however, one of the members is provided with a removable packing ring, and the other with a taper-projection seated and confined frictionally in the ring, the parts being thus capable of a relative motion about an axis coincident with the ring and projection. In the first mentioned form of joint, in which there is a swinging motion, one of the parts to be connected comprises a hollow member A, formed with two oppositely extending branch pipes a, a', to the ends of which are respectively connected cylindrical hollow chambers B, B', which chambers are in alinement and spaced apart. The other part to be connected comprises a pipe section C, having on its end a transverse hollow head D open at its ends and adapted to extend between the inner ends of the two chambers B, B', and be connected liquid-tight thereto by the packing ring 1 and the taper-projection 2, before alluded to.

The packing ring is of the form shown in Figs. 6, 7 and 8, consisting of an exteriorly threaded ring provided with an internal annular groove containing at intervals radial openings extending outwardly through the sides of the ring. In this groove and the radial openings is tightly seated a packing 1ª, preferably of Babbitt metal, the bore of which is tapered or conical to receive the taper-projection 2. The outer open ends of the hollow cross-head D are formed with peripheral internally threaded recesses, and in each of these threaded recesses one of the packing rings is screwed. The taper-projections 2 are adapted to fit closely and frictionally within the bore of the packing rings, and each projection is provided with a circular threaded shoulder 2ª, from which extends branch arms 2ᵇ, having connected with them a threaded central stem 2ᶜ. The inner ends of the two chambers B, B', are threaded internally and into them are screwed the threaded shoulders 2ᵃ, in such manner that the taper-projections will enter and seat tightly within the conical bore of the packing rings. To the outer ends of the threaded stems are applied caps F, F', which when screwed down on the stems closely seal or close the outer ends of the cylindrical chambers. These caps act as jam nuts in holding the taper-projections in their proper positions relative to the cylindrical chambers and to the packing rings. From this description it will be seen that the cross-head may swing or pivot around an axis passing centrally through the same and the two cylindrical chambers, journals between the parts being formed conjointly by the taper projections fitting in the conical bores of the packing rings.

In applying the invention to a swiveling joint of the form shown in the center of Fig. 1 and in Fig. 2, where the two members to be connected extend in line end to end, the taper-projection is in the form of a sleeve 3 screwed into the end of one of the pipe sections, and having its extremity tapered or inclined. The packing ring is of the same form described and screwed into an internally threaded recess in a sleeve 4, fixed to the other pipe section. The sleeve 3 is provided with an annular shoulder 3ᵃ at the end of its tapered portion, which is engaged by a clamping nut 5 encircling the sleeve and bearing at its end against the shoulder 3ᵃ, said nut being threaded on its external surface and screwed into the interior of the collar 4. By screwing this nut up against the shoulder 3ᵃ, it will act to draw the other section up endwise and thereby force the conical packing ring on and bind firmly against the tapered end of the collar, a binding nut 6 being applied to the threaded nut 5 and adapted to bear against the end of the overhanging collar 4. By this construction it will be seen that the two connected pipe sections are firmly joined together liquid-tight, but are capable of a swiveling motion one relatively to the other about a common longitudinal axis. The end of the tapered collar is extended and formed with a number of grooves 3ᵇ in order to relieve the friction between the parts and form spaces for the accumulation of grit.

In Fig. 3 I have shown a flexible joint applied to one of the pipe terminals G of a railway train pipe system. This joint comprises the depending connecting section C pivoted at its upper end between the branch pipes a, a' and at its lower end between the branch pipes of a second section C', this latter being adapted to be coupled with a similar section carried by the other car. In operation these parts assume the position shown in Fig. 3, and in order that the weight will be taken off the joints, I provide a spring H fixed at its upper end to the terminal and at its lower end to an arm h connected with the pipe section C'. As a result, this spring will tend to support the parts and thereby relieve the joints of their weight, and at the same time will maintain the lower section at an upward inclination, thereby avoiding the liability of its accidental disconnection from the section on the adjoining car.

It will be seen from the foregoing description that the joint is of simple construction, and by reason of the inclined or taper coöperating surfaces of the projection and packing ring, a tight joint may be maintained between them, while at the same time their free relative motion is permitted. In the event of the packing in the ring becoming worn, the latter may be easily removed by unscrewing it from the annular recess in which it is seated, and the packing renewed.

I have in the accompanying drawings illustrated my invention in the form which I prefer to adopt, and which in practice has been found to answer satisfactorily the results and advantages to be attained; but I wish to be understood that the invention is not limited to any specific form or details except in so far as such limitations are specified in the claims.

Having thus described my invention, what I claim is:—

1. In a pipe joint, the combination of a hollow member, a removable ring seated therein and formed with an interior groove and with openings extending outwardly therefrom, a packing seated in the groove and engaged in said openings and forming a bearing socket, a second hollow member having a projection thereon mounted rotatably in said bearing socket, and means for holding said parts against endwise separation while permitting their free rotation.

2. In a pipe joint and in combination with a hollow member provided with an annular bearing opening, a second hollow member provided with a chamber open at its inner and outer ends, a bearing projection screwed in the opening in the inner end of the chamber and provided with a stem extending axially within the chamber and threaded at its outer end, and a closing cap for the outer end of the chamber, said cap seated in the outer opening of the chamber and screwed on to the threaded end of the stem.

3. In a pipe joint, and in combination with a hollow member provided with opposing chambers, caps closing the outer ends of the chambers, stems connected with the caps and extending into the chambers, annular threaded shoulders on the stems screwed into the inner ends of the chambers, central tapered projections on the shoulders, a hollow head between the chambers formed in its ends with threaded annular recesses, hollow nuts screwed into said recesses, and a packing in the nuts surrounding the tapered projections.

In testimony whereof I affix my signature in presence of two witnesses.

CHARLES FORTH.

Witnesses:
 FRANK G. PARKER,
 JOHN BUCKLER.